United States Patent [19]
Resteghini

[11] Patent Number: 5,902,045
[45] Date of Patent: May 11, 1999

[54] RECLOSABLE BAG ASSEMBLY WITH SUSPENSION TAB

[75] Inventor: Carl Resteghini, Framingham, Mass.

[73] Assignee: The Kendall Company LP, Mansfield, Mass.

[21] Appl. No.: 08/979,205

[22] Filed: Nov. 26, 1997

[51] Int. Cl.⁶ .................................................. B65D 33/06
[52] U.S. Cl. ................................. 383/31; 383/4; 383/86; 383/204; 383/209
[58] Field of Search .................................... 206/363, 364, 206/806; 383/4, 5, 22, 23, 30, 31, 86, 204, 209

[56] References Cited

U.S. PATENT DOCUMENTS

| | | | |
|---|---|---|---|
| 1,606,944 | 11/1926 | Johnson | 383/86 |
| 1,743,681 | 1/1930 | Neuman | 383/24 |
| 1,866,241 | 7/1932 | Vineberg | 383/31 |
| 3,310,225 | 3/1967 | Hoblit et al. | 383/86 |
| 3,429,498 | 2/1969 | Dorfman | 383/86 |
| 3,693,867 | 9/1972 | Schwarzkopf | 383/86 |
| 3,814,303 | 6/1974 | Smith | 206/806 |
| 5,102,234 | 4/1992 | Levy | 383/209 |
| 5,503,476 | 4/1996 | Hamdan | 383/24 |
| 5,727,677 | 3/1998 | Peviani | 206/6.1 |

*Primary Examiner*—David T. Fidei
*Attorney, Agent, or Firm*—David J. Koris

[57] ABSTRACT

A reusable, reclosable, suspendable bag assembly facilitates storage of an object, such as a medical instrument, between uses. The bag assembly includes a suspension tab for hanging or carrying the bag. A closure flap is provided to fold over an opening of the bag to close the interior cavity therein. The bag assembly is formed in two sections, a removable section and a reusable, reclosable bag section. The removable section is attached to the reclosable bag section by tear lines that allow the removable section to be readily detached from the bag section by a user.

25 Claims, 5 Drawing Sheets

RECLOSABLE BAG ASSEMBLY WITH SUSPENSION TAB

BACKGROUND OF THE INVENTION

Certain medical or other instruments are delivered to the end user in closed pouches or bags. The user opens the bag to remove the instrument. Some instruments are intended for more than one use, such as syringes for enteral feedings or irrigation catheters. In this instance, it is useful to store the instrument in the same pouch or bag between uses.

One type of known bag is formed of two sheets of material sealed along a portion of their peripheries. A line of perforations extends transversely across each sheet above the sealed peripheries, each line offset from the other line of perforations. The user grasps the bag above and below the perforations to separate the sheets at the perforations, leaving one sheet longer than the other. The longer extent forms a flap which can be folded over the shorter sheet to reclose the bag.

BRIEF SUMMARY OF THE INVENTION

The present invention provides a reclosable, suspendable bag assembly having a suspension tab to facilitate storage of an object, such as a medical instrument, between uses or carrying of the bag.

The bag assembly comprises a top sheet or layer of flexible material, a middle sheet or layer of flexible material, and a bottom sheet or layer of flexible material. A portion of the peripheries of the top sheet and the middle sheet are sealed together to define an interior cavity for receiving the object. The sealed portion of the periphery terminates at opposed locations on opposite sides of the sheets to define a transversely extending opening to the interior cavity. The bottom sheet is affixed to the middle sheet adjacent the opening to the interior cavity and extends away from the interior cavity.

The top sheet includes a tear line extending transversely across a width of the top sheet adjacent the opening. The middle sheet also includes a tear line extending transversely across a width of the middle sheet and offset from the top sheet tear line in a direction away from the interior cavity. The bottom sheet similarly includes a tear line extending transversely across a width of the bottom sheet and aligned with the middle sheet tear line. An aperture is formed in the bottom sheet between the opening to the interior cavity and the bottom sheet tear line.

The top sheet, the bottom sheet, and the middle sheet can be separated along the tear lines to provide a bag section and a removable section. The bag section includes a portion of the middle sheet extending from the interior cavity to form the closure flap and a portion of the bottom sheet having the aperture to form the suspension tab.

After using the instrument, the user may return it to the bag section. The closure flap is folded over the opening in the bag section to close the interior cavity. A releasable fastener may be provided to hold the closure flap in the closed position. The bag can be hung on a hook or carried to another location. The bag can be reused in this manner multiple times.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
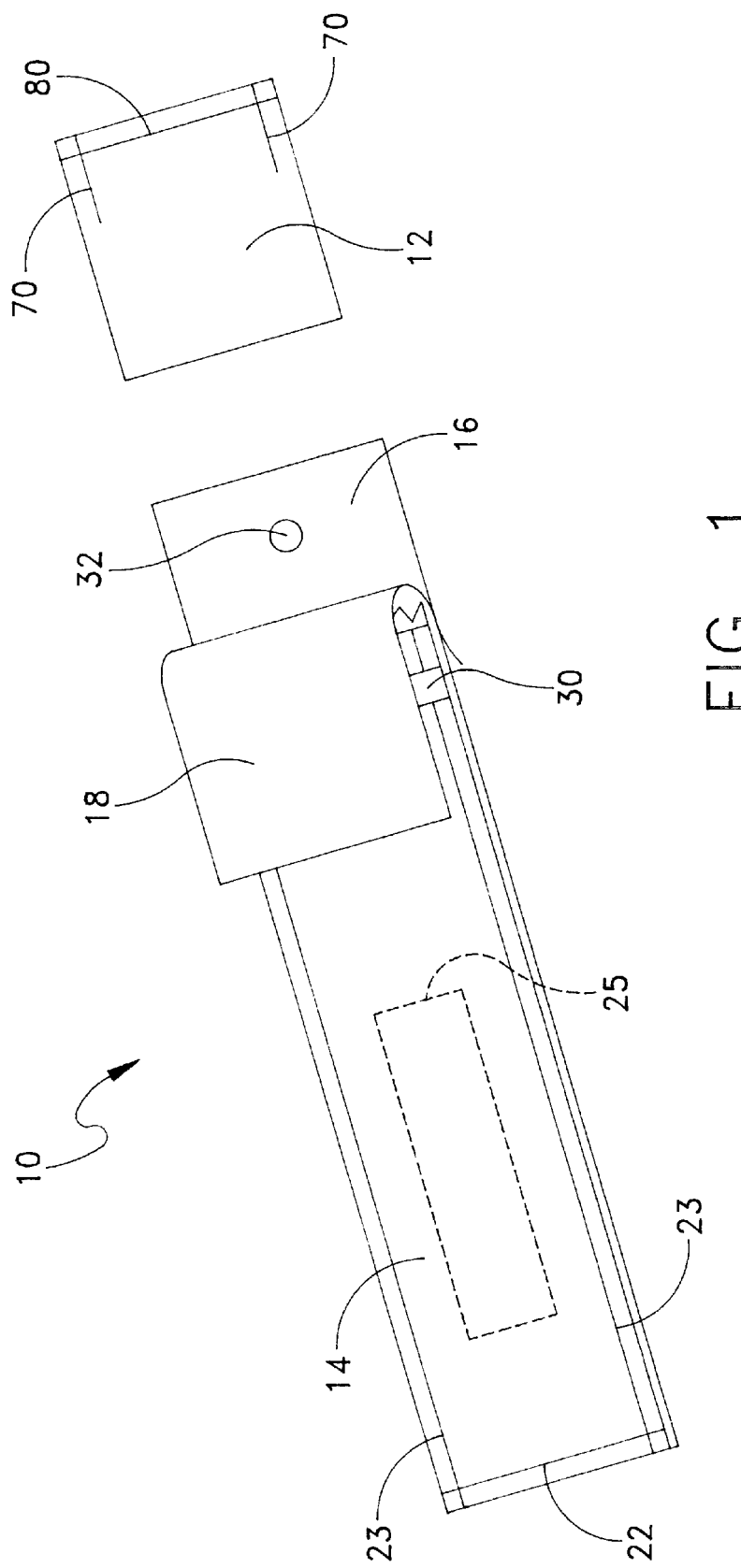
FIG. 1 is an isometric view of a bag assembly according to the present invention separated into a reusable, reclosable, bag portion and a removable portion.
Figure 5:
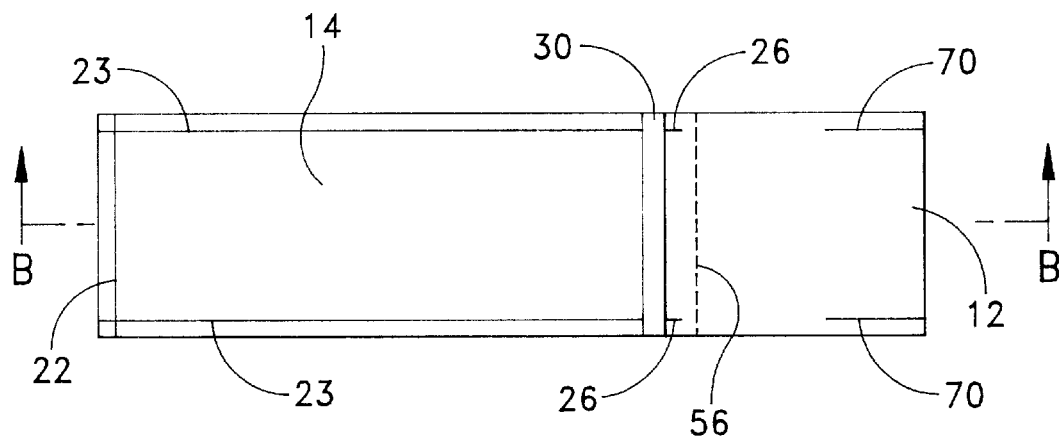
FIG. 5 is a top plan view of the bag assembly of FIG. 1 in which the bag portion and the removable portion have not been separated.
Figure 8:
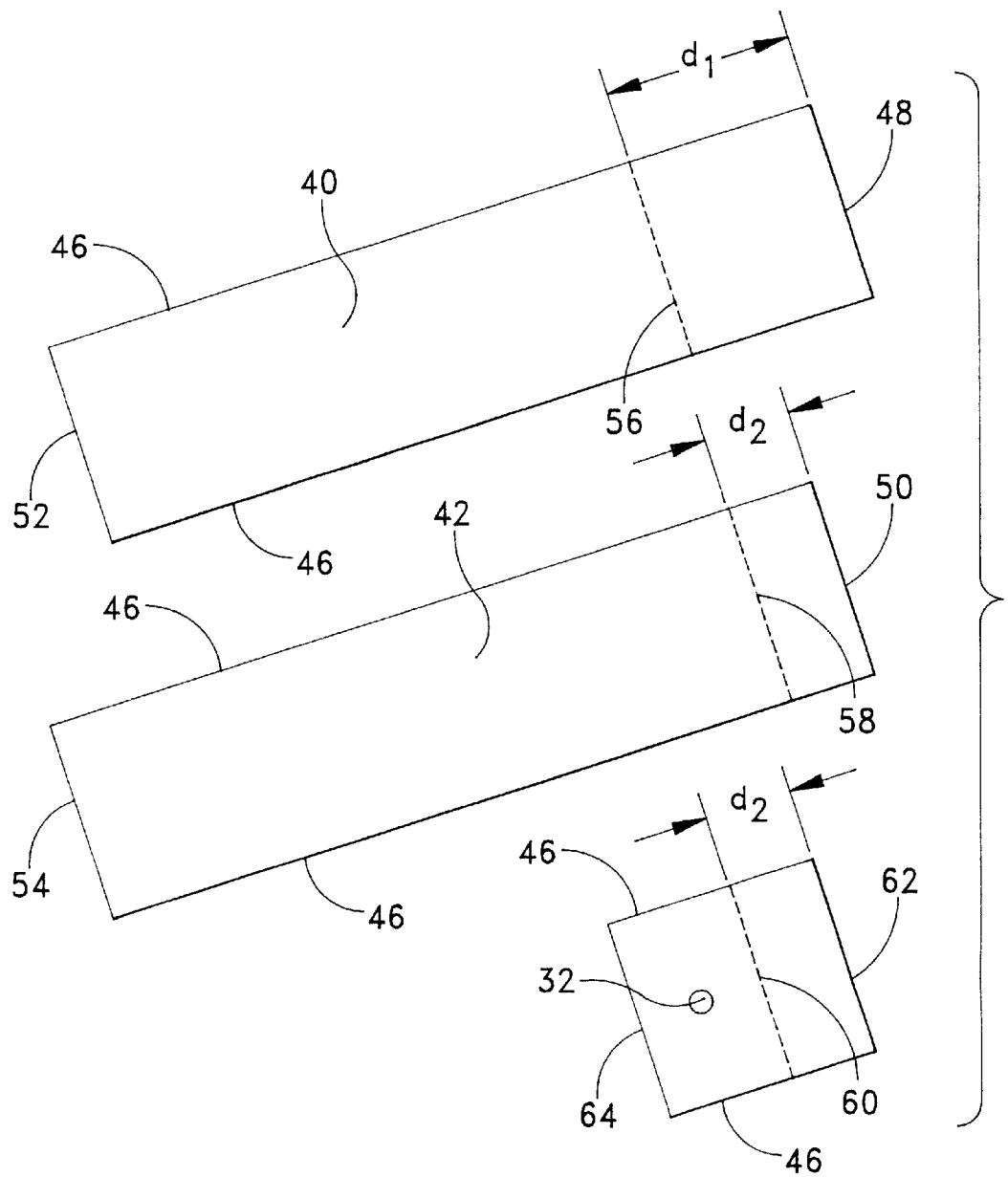
FIG. 8 is an exploded isometric view of the bag assembly of FIG. 1 is an unassembled configuration.

Referring to FIG. 1, a reclosable bag or pouch assembly 10 according to the present invention includes a bag assembly formed in two sections, a removable section 12 and a reusable, reclosable bag section 14. The bag section 14 includes a suspension tab 16 for hanging or carrying the bag and a closure flap 18 for reclosing the bag. The removable section is attached to the reclosable bag section by tear lines 56, 58, 60 (FIGS. 5, 6, and 8) that allow the removable section 12 to be readily detached from the bag section 14 by a user.

Figure 2:
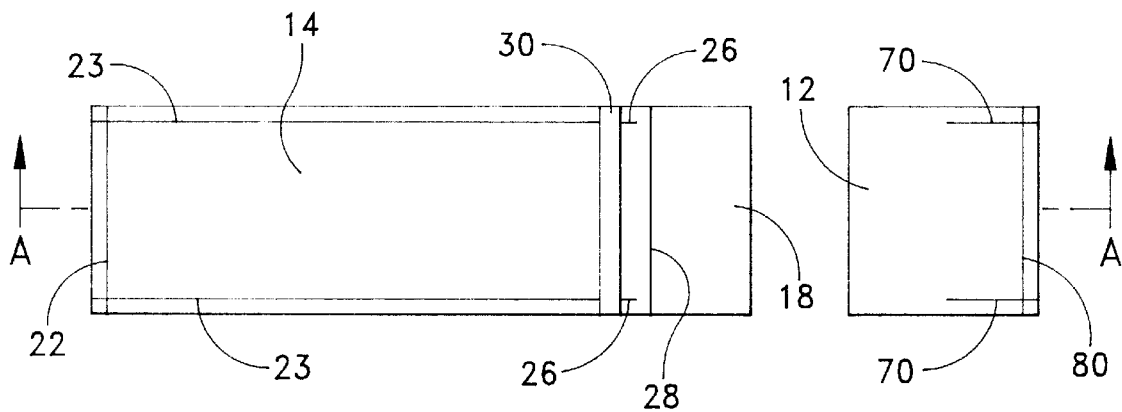
FIG. 2 is a top plan view of the bag assembly of FIG. 1.
Figure 3:
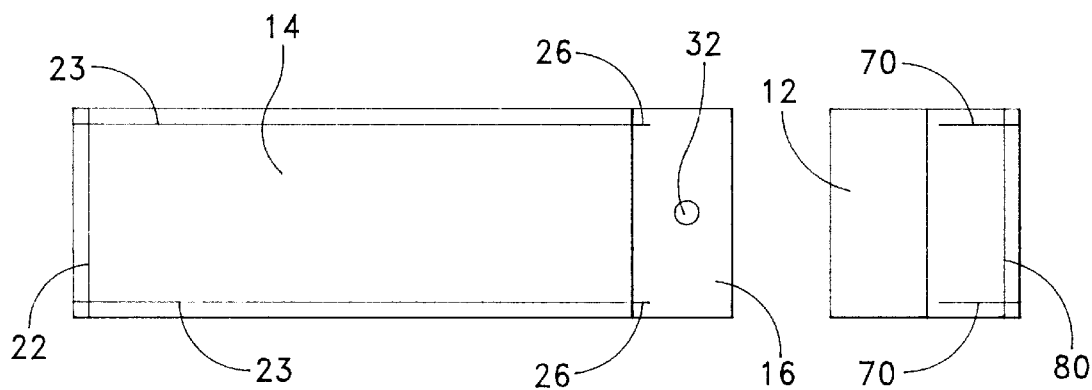
FIG. 3 is a bottom plan view of the bag assembly of FIG. 2.
Figure 4:
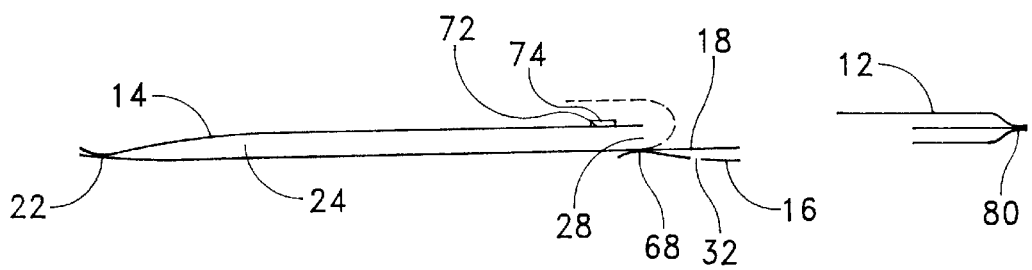
FIG. 4 is a side view of the bag assembly taken along line A—A of FIG. 2.

After detachment, the reclosable bag section comprises a bag sealed along lines 22, 23 about a portion of its periphery to define an interior cavity 24 for holding an object 25. The sealed portion of the periphery terminates at opposed locations 26 on opposite sides to define a transversely extending opening 28 to the interior cavity 24 (FIGS. 2, 3, and 4). The closure flap 18 extends beyond the opening 28 and can be folded over the opening to close the interior cavity 24, as illustrated in phantom in FIG. 4. The flap 18 may be retained in the folded configuration with a releasable fastener 30, such as a strip of adhesive 12 on the bag or flap. The suspension tab 16 also extends beyond the opening, below the closure flap. (See particularly FIGS. 4 and 7.) An aperture 32 is formed in the suspension tab to allow the bag to be hung from a hook, such as is found on a pole for hanging medications, or to be carried, such as by hand. The size of the aperture can be varied to suit the application. Similarly, two or more apertures may be provided if desired.

Figure 9:
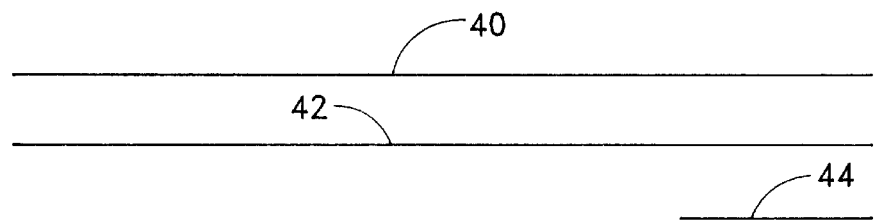
FIG. 9 is an exploded side view of the bag assembly of FIG. 8.

The bag assembly, including the removable section 12 and the bag section 14, is formed from three sheets or layers: a top sheet 40, a middle sheet 42, and a bottom sheet 44. (See FIGS. 7, 8, and 9.) The sheets may be made from any suitable flexible film material, such as, for example, a polyethylene, polypropylene, or nylon. The sheets may include an antimicrobial component or coating it desired. The sheets preferably are rectangular and have the same width between the sides 46. The top sheet 40 and the middle sheet 42 are longer than the bottom sheet 44, and during assembly, are of equal length from their upper ends 48, 50 to their lower ends 52, 54. A tear line 56 extends transversely across the width of the top sheet 40 at a distance $d_1$ from the upper end 48 of the sheet. Another tear line 58 extends transversely across the width of the middle sheet 42 at a distance $d_2$ from the upper end 50 of the sheet. The distance $d_2$ is less than the distance $d_1$, such that, when the top and middle sheets are vertically overlaid with the upper ends 48, 50 and lower ends 52, 54 aligned, the tear lines 56, 58 are offset horizontally from each other. A further tear line 60 also extends transversely across the width of the bottom sheet 44, also at a distance $d_2$ from the upper end 62 of the bottom sheet. Thus, when the middle sheet and bottom sheet are vertically overlaid with the upper ends 50, 62 aligned, the tear lines 58, 60 are also vertically aligned.

For clarity, the tear lines 56, 58, 60 are indicated schematically in the figures as lines of perforations extending transversely across the sheets. However, the tear lines may be formed in any other suitable manner known in the art, such as by notches formed in the sides of the sheets, or thinned or otherwise weakened regions formed such as by heating the sheets in the regions of the tear lines.

As noted above, the bottom sheet 44 also includes an aperture 32 therein. The aperture is generally centered in the area between the aides 44 and between the lower end 64 and the tear line 60. The aperture may be sized to fit over a hook to allow the bag to be hung or to form a carrying handle, as described above.

Figure 6:
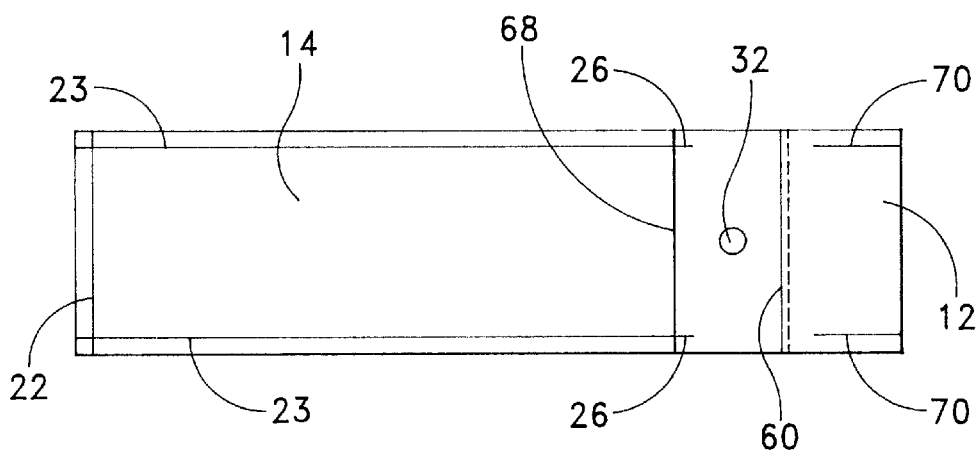
FIG. 6 is a bottom plan view of the bag assembly of FIG. 5.
Figure 7:
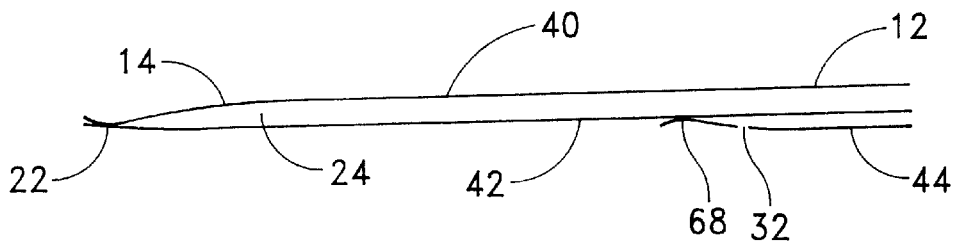
FIG. 7 is a side view of the bag assembly taken along line B—B of FIG. 5.

In assembly, the middle sheet 42 and the bottom sheet 44 are vertically overlaid with their sides 46 and upper ends 50, 62 aligned, and the sheets are sealed together along a line 68 adjacent the lower end 64 of the bottom sheet (FIGS. 6 and 7). The top sheet 40 is vertically overlaid over the middle sheet 42 and the bottom sheet 44 with the sides 46 and the upper ends 48, 50, 62 aligned; the lower ends 52, 54 of the top sheet 40 and the middle sheet 42 are also aligned. The top and middle sheets are sealed along the line 22 adjacent the lower ends 52, 54 and along the lines 23 adjacent the sides 46 for a distance extending from the ends 52, 54 up to, but not crossing, the tear line 56 in the top sheet 40. These seal lines define the interior cavity 24 of the bag which contains the instrument. All three sheets are sealed on lines 70 along the sides for a distance extending from the upper ends 48, 50, 62 to, but not crossing, the tear lines 58, 60 in the middle sheet and bottom sheet. The seals, indicated schematically by lines 22, 23, 68, and 70, can be formed in a variety of ways, as are known in the art, such as by heat sealing, RF welding, adhesive, stitching, or impulse sealing.

A releasable fastener 30 for the closure flap 18 is formed on the bag section. Preferably, the fastener is formed from a strip of adhesive 72 laid down along the top sheet parallel to the opening 28 or on the closure flap 18. The adhesive strip is preferably covered with a liner strip 74 of paper or plastic to protect the adhesive, but which can be readily removed by a user to expose the adhesive when needed (FIG. 4). Any suitable adhesive which resists permanently sticking to the closure flap, such as an acrylic adhesive, can be used. Alternatively, other types of fastener devices can be provided. For example, a slit could be placed in the top sheet into which the closure flap can be tucked. Similarly, a further sheet of material can be sealed to the top sheet to form a pocket into which the closure flap can be tucked. In another embodiment, a snap type fastener can be cooperatively provided on the top sheet and the closure flap.

The upper ends 48, 50, 62 of the sheets are left open to allow insertion of an instrument into the interior cavity 24 between the top and middle sheets. After the instrument has been inserted into the bag, the upper ends can be sealed along line 80 to prevent the instrument from falling out of the bag.

In use, after removing the bag assembly from the outer package, a user grasps the bag assembly on opposite sides of the tear lines 56, 58, 60 and pulls or snaps the assembly to break the sheets at the tear lines. The removable section 12 may be discarded. The user removes the instrument for use and, after use, returns the instrument to the bag section 14. The closure flap 18 is folded over the opening 28 in the bag section to close the bag. The bag can be hung on a hook on, for example, a pole using the hole in the suspension tab. When the instrument is subsequently needed, the user can take the bag off the hook, open the closure flap, and remove the instrument. The bag can be reused in this manner multiple times.

Figure 10:
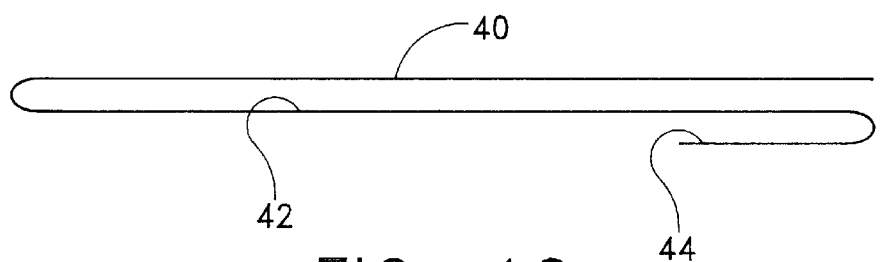
FIG. 10 is a side view of an alternative embodiment.
Figure 11:
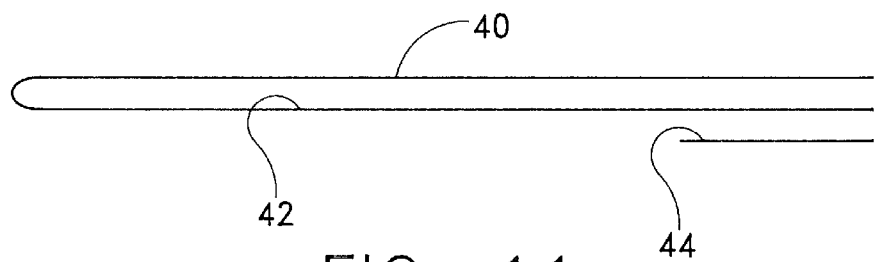
FIG. 11 is a side view of a further alternative embodiment.
Figure 12:
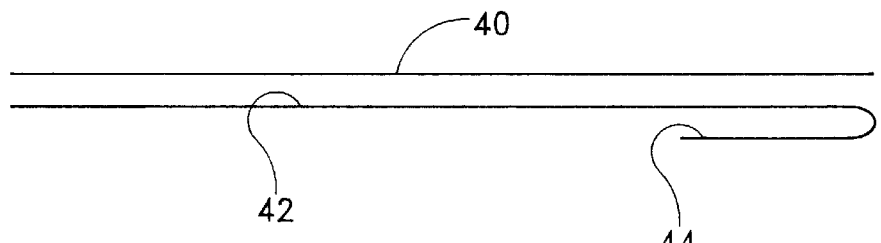
FIG. 12 is a side view of a still further alternative embodiment.

The top, middle, and bottom sheets have been shown as separate sheets. However, two sheets (the top and middle sheets or the middle and bottom sheets) or all three sheets could be provided as a single sheet folded at the upper and/or lower ends, as shown in FIGS. 10, 11, and 12. Similarly, the bag could be formed with gussets or side panels to, for example, allow expansion or provide a greater volume.

The invention is not to be limited by what has been particularly shown and described, except as indicated by the appended claims.

I claim:

1. A reclosable, suspendable bag comprising:
   a bag portion comprising a first layer of flexible material and a second layer of flexible material, the first and second layers joined along a periphery to form an interior cavity, a portion of the periphery having an opening therein, whereby an object can be placed in the cavity;
   a closure flap extending from the bag portion beyond the opening, the closure flap configured to be foldable over the opening; and
   a suspension tab extending in a plane from the bag portion beyond the opening, the suspension tab having an aperture therein configured to receive a device for hanging or carrying, the suspension tab affixed to an outer surface of the closure flap.

2. The reclosable, suspendable bag of claim 1, further comprising a releasable fastening device disposed to retain the closure flap in a folded configuration over the opening.

3. The reclosable, suspendable bag of claim 2, wherein the fastening device comprises an adhesive strip, a pocket, or a hook and loop type fastener.

4. The reclosable, suspendable bag of claim 1, wherein the first layer and the second layer are formed of a film of a polyethylene, polypropylene or nylon.

5. The reclosable, suspendable bag of claim 1, further comprising an instrument disposed in the interior cavity.

6. The reclosable, suspendable bag of claim 1, wherein the bag portion further includes an antimicrobial component or coating.

7. The reclosable, suspendable bag of claim 1, wherein the bag portion further includes side panels or gussets between the first layer and the second layer.

8. The reclosable, suspendable bag of claim 1, wherein the first layer and the second layer are formed from a unitary piece of a sheet material.

9. A reclosable, suspendable bag assembly comprising:
   a top sheet of flexible material, a middle sheet of flexible material, and a bottom sheet of flexible material;
   a portion of the peripheries of the top sheet and the middle sheet sealed together to define an interior cavity for receiving an object, a transverse extent of the top and bottom sheets between terminations of the sealed portion of the peripheries defining an opening to the interior cavity;

the bottom sheet affixed to the middle sheet adjacent the opening to the interior cavity and extending away from the interior cavity;

the top sheet including a tear line extending transversely across a width of the top sheet adjacent the opening;

the middle sheet including a tear line extending transversely across a width of the middle sheet and offset from the top sheet tear line in a direction away from the interior cavity;

the bottom sheet including a tear line extending transversely across a width of the bottom sheet; and an aperture formed in the bottom sheet between the opening to the interior cavity and the bottom sheet tear line;

whereby the top sheet, the bottom sheet, and the middle sheet can be separated along the tear lines to provide a bag section and a removable section, the bag section including a portion of the middle sheet extending from the interior cavity to form a closure flap, and a portion of the bottom sheet having the aperture therein extending from the interior cavity to form a suspension tab.

10. The reclosable, suspendable bag assembly of claim 9, further comprising a releasable fastening device disposed to retain the closure flap in a folded configuration over the opening.

11. The reclosable, suspendable bag assembly of claim 10, wherein the fastening device comprises an adhesive strip, a pocket, or a hook and loop type fastener.

12. The reclosable, suspendable bag assembly of claim 9, wherein the first sheet and the second sheet are formed of a film of a polyethylene, polypropylene or nylon.

13. The reclosable, suspendable bag assembly of claim 9, further comprising an instrument disposed in the interior cavity.

14. The reclosable, suspendable bag assembly of claim 9, wherein the bag portion further comprises an antimicrobial component or coating.

15. The reclosable, suspendable bag of claim 9, wherein the bag portion further includes side panels or gussets between the first sheet and the second sheet.

16. The reclosable, suspendable bag of claim 9, wherein the tear lines of the first sheet, the second sheet, and the third sheet each comprise a line of perforations, side notches, or a weakened region in the respective first, second, and third sheets.

17. A reclosable, suspendable bag comprising:

a first layer of flexible material and a second layer of flexible material, the first and second layers joined along a periphery to form a bag portion having an interior cavity, a portion of the periphery having an opening therein sized to receive an object therein;

the second layer extending from the bag portion beyond the opening to form a closure flap, the closure flap configured and located to be foldable over the opening;

the first layer including a tear line extending transversely across a width adjacent the opening, and the second layer including a tear line extending transversely across a width adjacent an edge of the closure flap to define a removable portion, whereby the first layer and the second layer can be separated along the tear lines to remove the removable portion; and a third layer of flexible material forming a suspension tab extending from the bag portion beyond the opening adjacent the closure flap, the suspension tab having an aperture therein configured to receive a device for hanging or carrying.

18. The reclosable, suspendable bag of claim 17, further comprising a releasable fastening device disposed to retain the closure flap in a folded configuration over the opening.

19. The reclosable, suspendable bag of claim 18, wherein the fastening device comprises an adhesive strip, a pocket, or a hook and loop type fastener.

20. The reclosable, suspendable bag of claim 17, wherein the first layer, the second layer, and the third layer are formed of a film of a polyethylene, polypropylene or nylon.

21. The reclosable, suspendable bag of claim 17, further comprising an instrument disposed in the interior cavity.

22. The reclosable, suspendable bag of claim 17, wherein the bag portion further includes an antimicrobial component or coating.

23. The reclosable, suspendable bag of claim 17, wherein the bag portion further includes side panels or gussets between the first layer and the second layer.

24. The reclosable, suspendable bag of claim 17, wherein the first layer, the second layer, and the third layer are formed from a unitary piece of a sheet material.

25. The reclosable, suspendable bag assembly of claim 9, wherein the top sheet, the middle sheet, and the bottom sheet are formed from a unitary piece of a sheet material.

* * * * *